United States Patent [19]

Kanda

[11] Patent Number: 5,640,218
[45] Date of Patent: Jun. 17, 1997

[54] FOLDABLE SPECTACLES WITH TEMPLE MEMBERS HAVING DEFORMABLE EARPIECES FOR FITTING INTO COMPACT CASE

[75] Inventor: Koji Kanda, Osaka, Japan

[73] Assignee: Kanda Optical Co., Ltd., Japan

[21] Appl. No.: 577,175

[22] Filed: Dec. 22, 1995

[51] Int. Cl.⁶ ........................................................ G02C 5/08
[52] U.S. Cl. ................................. 351/63; 351/41; 2/454
[58] Field of Search ........................... 351/63, 118, 119, 351/111, 121, 122, 123, 41, 158; 2/454

[56] References Cited

U.S. PATENT DOCUMENTS

| | | |
|---|---|---|
| 4,655,564 | 4/1987 | Czech . |
| 4,740,069 | 4/1988 | Baum . |
| 4,776,686 | 10/1988 | Stanley . |
| 4,820,035 | 4/1989 | Kanda . |
| 4,955,708 | 9/1990 | Kahaney .................. 351/118 |

FOREIGN PATENT DOCUMENTS

| | | |
|---|---|---|
| 056844A1 | 1/1980 | European Pat. Off. . |
| 515826A1 | 2/1992 | European Pat. Off. . |
| 512173A1 | 11/1992 | European Pat. Off. . |
| 920237435 | 7/1994 | Japan . |
| 6281891 | 7/1994 | Japan ................ 351/63 |
| 89/06822 | 7/1989 | WIPO . |
| 95/12140 | 5/1995 | WIPO . |

Primary Examiner—Hung X. Dang
Attorney, Agent, or Firm—Pravel, Hewitt, Kimball & Krieger

[57] ABSTRACT

Spectacles accommodated in a flat case comprise an auxiliary temple member pivoted to the outer end of upper side of a lens frame and a main temple member pivoted to a free end of the temple member, the temple members being folded generally in the same plane as the lens frame and prepared from a light metal. The main temple member is provided at its outer end with an earpiece prepared from an easily elastically deformable synthetic resin and having an ear-engaging bent portion at the earpiece outer end. The spectacles can be worn by the user with good stability by engaging the bent portion on the ear from above. The case has a small height $H_0$ less than the bend height H of the bent portion and corresponding to the overall thickness of the lens frame and the auxiliary temple member as folded. The earpiece is made of the easily elastically deformable resin, so that when a lid of the case is closed with the temple members folded in the same plane as the lens frame for encasing, the earpiece is moved along the case bottom and elastically deformed by being pushed by the lid, whereby the spectacles are accommodated in the flat case.

8 Claims, 5 Drawing Sheets

FOLDABLE SPECTACLES WITH TEMPLE MEMBERS HAVING DEFORMABLE EARPIECES FOR FITTING INTO COMPACT CASE

FIELD OF THE INVENTION

The present invention relates to the combination of spectacles foldable to a small thickness and a spectacle case.

BACKGROUND OF THE INVENTION

The present applicant has already proposed spectacles which comprise, as shown in FIG. 6A, a lens frame 1 and a temple 3 including an auxiliary temple member 31 pivoted to the outer end of upper side of the lens frame 1 and a main temple member 32 pivoted to a free end of the auxiliary temple member 31, the temple 3 being foldable generally in the same plane as the lens frame 1 so that the spectacles can be folded to a flat platelike form (U.S. Pat. No. 4,820,035).

The foldable spectacles described have a small overall size and shortened temples 3 and are worn with the forehead held between the two temples 3 (see FIG. 8).

In the case where the proposed spectacles are made large-sized, the temples 3 must be firmly fittable to the head of the user, but bent portions passing behind the ears can not be provided at the outer ends of the temples 3 because of the limitation imposed by the foldability. The temple 3 therefore has a straight earpiece 36. For this reason, the spectacles are low in stability when worn and likely to slip down.

If the bent portion 37 to be passed over the ear is formed at the outer end of the main temple member 32 as shown in FIG. 6B, the spectacles can be given improved stability when worn (see FIG. 9). However, if the main temple member is provided with the bent portion 37 at its outer end, the temple 3 can not be folded in the same plane as the lens frame 1 when the spectacles are to be placed into a flat case 7 since the bent portion 37 has a height H of about 24 mm in a vertical plane. A problem is then encountered in that the spectacle case 7 becomes thicker and bulky when carried about, and the foldable spectacles are not suitable as such. Incidentally, the term "spectacles" as used herein not only refers to spectacles having lenses fitted therein but also includes the spectacle frame itself.

SUMMARY OF THE INVENTION

The main object of the present invention is to overcome the above problem and provide encased foldable spectacles wherein each temple 3 is provided with a bent portion 37 and which can nevertheless be accommodated in a flat spectacle case 7 having a small thickness $H_0$ ($H_0$<H) of about 5 mm, with the temples 3 positioned in the same plane as lens frames 1, by folding the temples in the spectacle case to the shape shown in FIG. 6A and thereafter closing a lid of the case, the spectacles thus being made convenient to use and to carry about.

The present invention provides spectacles having a temple 3 attached to each lens frame 1 and comprising an auxiliary temple member 31 and a main temple member 32, the lens frame 1 and the temple 3 being foldable generally in a plane. The main temple member 32 has one end foldably connected to the auxiliary temple member 31 and the other end provided with an earpiece 36 having a bent portion 37 engageable with the ear. The temple 3 is made of a light metal, while the earpiece 36 is prepared from a synthetic resin which is elastically deformable easily. The spectacle case 7 has a small thickness $H_0$ to which is less than the height H of the bent portion 87 and corresponds to the height of the assembly of the lens frames 1, auxiliary temple members 81 and main temple members 82 as folded to a flat platelike form.

The spectacles of the present invention can be worn with good stability by engaging the bent portion 37 at the outer end of each earpiece 36 with the ear from above.

Since the bent portions 37 are prepared from the easily elastically deformable synthetic resin, the bent portions 37 are elastically deformed so as to be positioned in the same plane as the lens frames 1 by being pushed by the lid 71 of the case 7 when the lid 71 is closed after the spectacles are placed into the case with the temples 3 folded. Accordingly, the case 7 can be given a reduced thickness and made less bulky for portable use without considering the height H of the bent portions 37.

When the case lid 71 is opened, relieving the bent portions 37 of the pressure, the bent portions 37 restore themselves, and the spectacles can be worn with good stability by engaging the bent portions 37 with the ears.

DESCRIPTION OF THE PREFERRED EMBODIMENT

Figure 1:
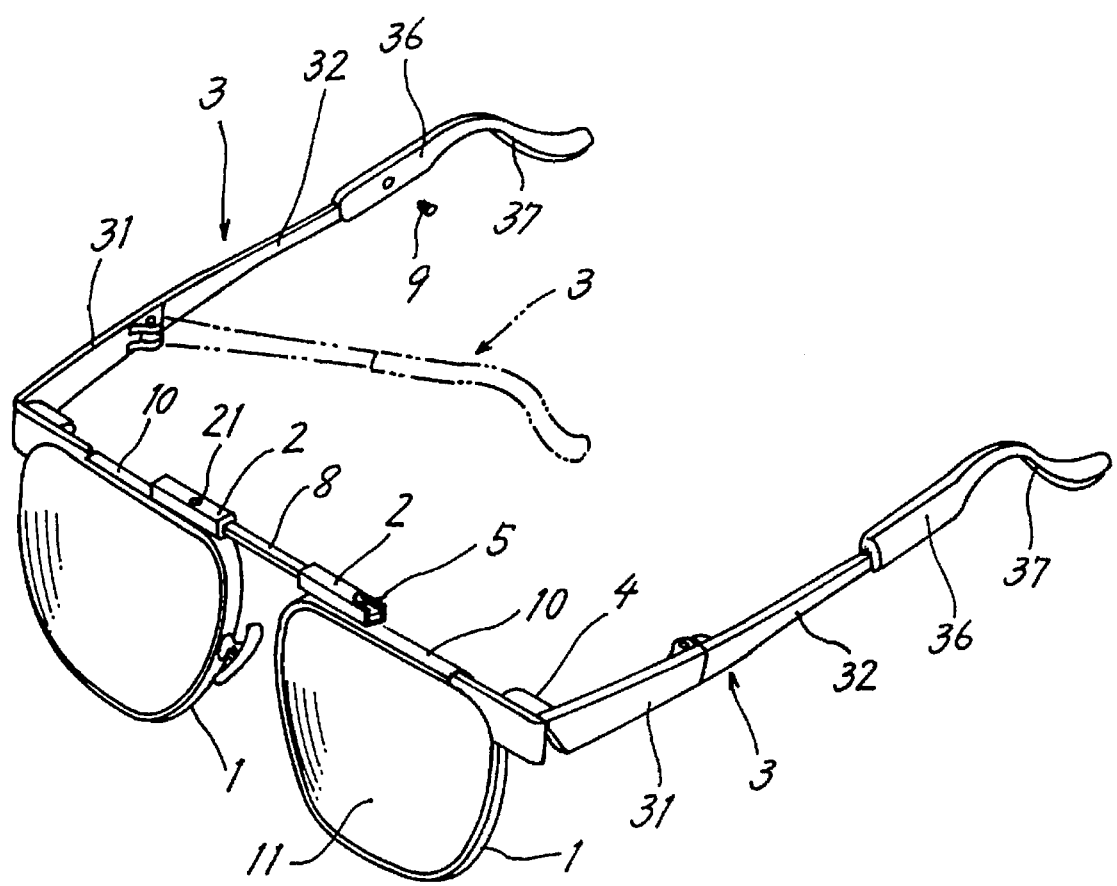
FIG. 1 is a perspective view of foldable spectacles of the invention.

With reference to FIG. 1, spectacles have opposite lens frames 1, 1 connected together by a bridge piece 8 and movable toward or away from each other. A temple 3 projecting from each lens frame 1 is made of a light metal, and can be folded generally in the same plane as the lens frame 1 as is the case with the conventional example shown in FIG. 6A.

Two opposed sheaths 2, 2 each in the form of a flat tube of rectangular cross section are provided on the upper sides 10, 10 of the two lens frames 1, 1, respectively, and the bridge piece 8 is slidably fitted in both sheaths 2, 2.

A screw 5 is screwed in one end of the bridge piece 8 to prevent the piece 8 from slipping off from one of the sheaths 2. The other end of the bridge piece fitting in the other sheath 2 is clamped thereto by a fastening screw 21.

The clamped position of the bridge piece 8 is determined by adjusting the distance between the centers of lenses 11, 11 fitted in the lens frames 1, 1 to the pupillary distance of the wearer. When the two lens frames are then moved away from each other to the greatest extent, the center-to-center distance automatically corresponds to the pupillary distance of the wearer.

The temple 3 is prepared from a light metal such as titanium and comprises an auxiliary temple member 31 having a length corresponding to the vertical width of the lens frame 1, and a main temple member 32 foldably connected to the auxiliary temple member 31.

Figure 2:
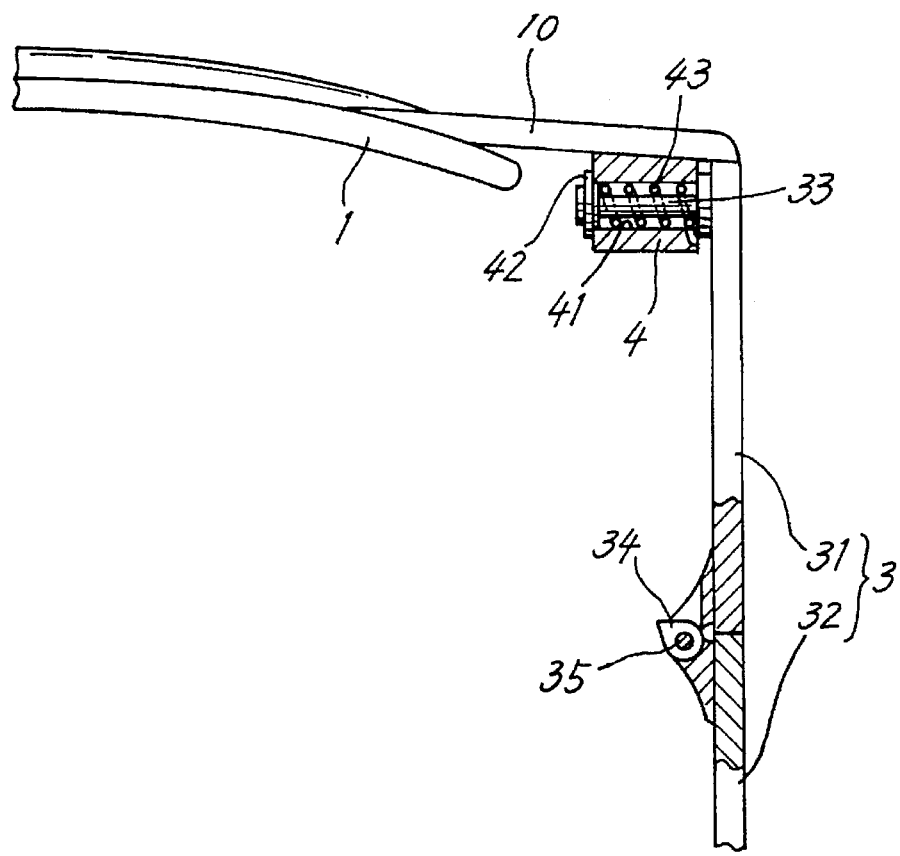
FIG. 2 is a sectional view of pivoted portions when a temple is unfolded.
Figure 3:
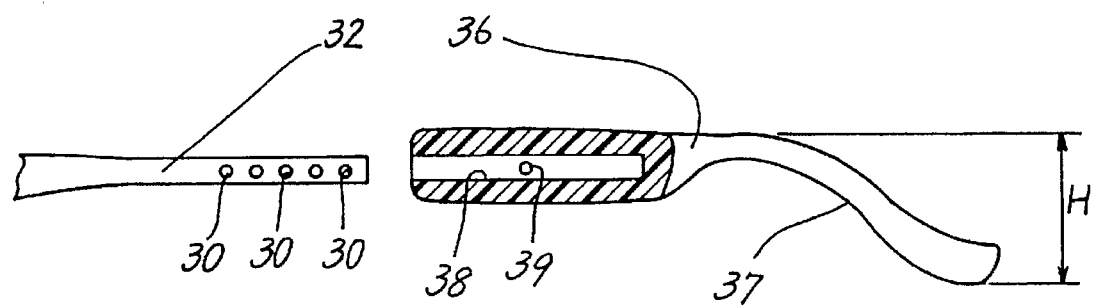
FIG. 3 is a diagram for illustrating a main temple member and an earpiece as separated therefrom.

With reference to FIG. 2, the auxiliary temple member 31 has a base end which is provided with a support pin 33 extending along the upper side 10 of the lens frame 1. The support pin 33 is loosely fitted in a lateral bore 41 of a block 4 provided on the lens frame 1, and is prevented from slipping off by a retaining ring 42.

A torsion spring 43 is disposed in the lateral bore 41 around the support pin 33 and has one end engaged with the support pin 33 and the other end engaged with the block 4 for biasing the auxiliary temple member 31 in an unfolding direction within a plane orthogonal to the support pin 33.

When the support pin 33 shown in FIG. 2 and projecting from the auxiliary temple member 31 is slightly so inclined as to position its outer end a larger distance away from the upper side 10, the temples 3, 3 can be spaced apart by an increased distance at their free ends when unfolded since each temple 3 rotates about the support pin 33.

Alternatively, the support pin 33 may be provided on the upper side 10 and the block 4 on the auxiliary temple member 31 to rotatably connect the auxiliary temple member 31 to the upper side 10.

The main temple member 32 has a base end supported by a pivot 35 on the free end of the auxiliary temple member and an outer end provided with an earpiece 36.

Figure 6A:
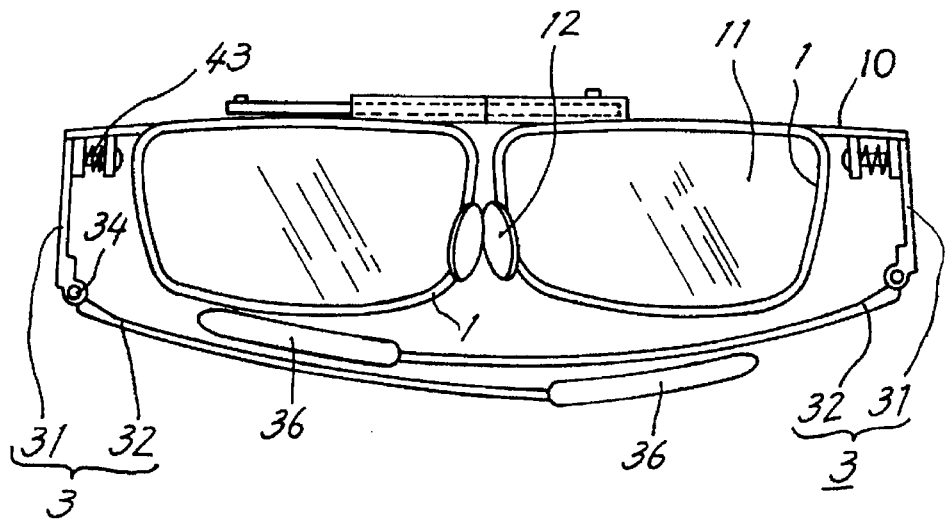
FIG. 6A is a rear view of conventional spectacles as folded.
Figure 6B:
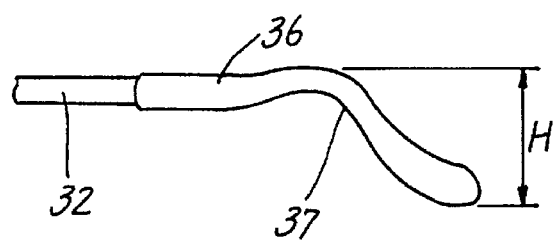
FIG. 6B is an imaginary view showing a bent portion formed in the earpiece of the spectacles of FIG. 6A.

The base end of the main temple member 32 has a stopper 34 bulging toward the auxiliary temple member 31 beyond the pivot 35. When the main temple member 32 is folded, the stopper 34 comes into contact with the auxiliary temple member 31 to limit the folding angle of the main temple member 32. The stopper 34 serves to prevent the main temple member 32 from being positioned too inward when the temple 3 is folded generally in the same plane as the lens frames 1, 1 as shown in FIG. 6A, eliminating the likelihood of the main temple member 32 defacing the lens by lapping over the lens 11.

The earpiece 36 attached to the main temple member 32 has an ear-engaging bent portion 37. The bent portion 37 has an outer end curved downward and inward by a height H so as to be engageable with the ear easily from above.

The earpiece 36 is prepared from a synthetic resin called a superelastic resin and elastically deformable easily. The expression "elastically deformable easily" means the property of the resin that even if excessively bent through an angle of at least about 90 degrees, the resin restores itself immediately when relieved of the force. Examples of such superelastic resins are products of Teijin Amoco Engineering Plastics Co., Ltd. (Minato-ku, Tokyo, Japan), i.e., polyphenylsulphone R-5000 (brand name) and Polyethersulphone (brand name), and like thermoplastic resins.

The earpiece 36 is joined to the main temple member 32 by tightly fitting the outer end of the temple member 32 into an insertion bore 38 formed in the base end of the earpiece 36 and driving a screw 9 into holes 39 and 30 formed in the earpiece 36 and the temple member 32, respectively, to fasten the earpiece.

With the present embodiment, the outer end portion of the main temple member 32 is formed with a plurality of screw holes 30, and a suitable length of the temple member end portion having the holes 30 is cut off in conformity with the wear to adjust the length of the main temple member 32 before fastening the earpiece 36.

The bent portion 37 at the outer end of each earpiece 36 is engaged with the ear from above, whereby the spectacles can be worn with good stability. The earpiece 36, which is elastically deformable easily, feels soft and comfortable when fitting to the head side portion and around the ear.

Figure 4:
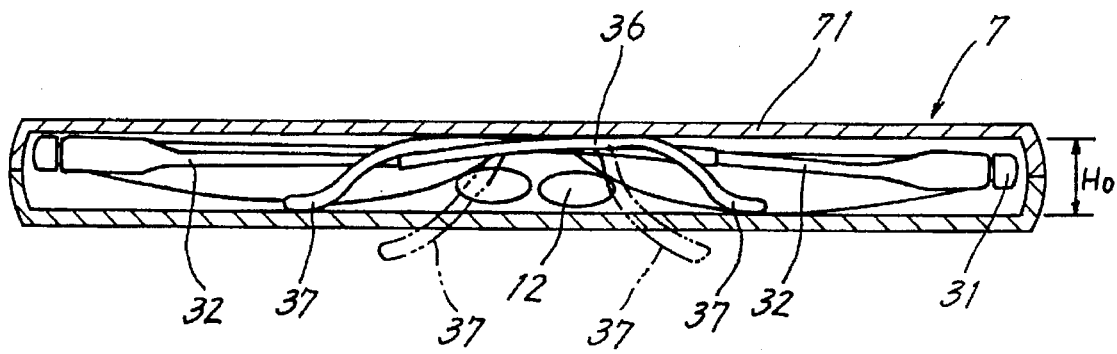
FIG. 4 is a view showing a case in longitudinal section with the spectacles placed therein.
Figure 5:
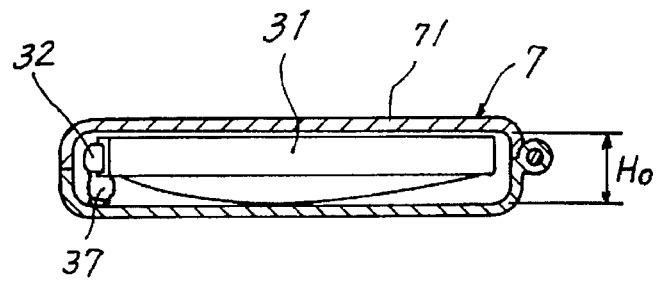
FIG. 5 is a view showing the case in widthwise section with the spectacles placed therein.
Figure 7:
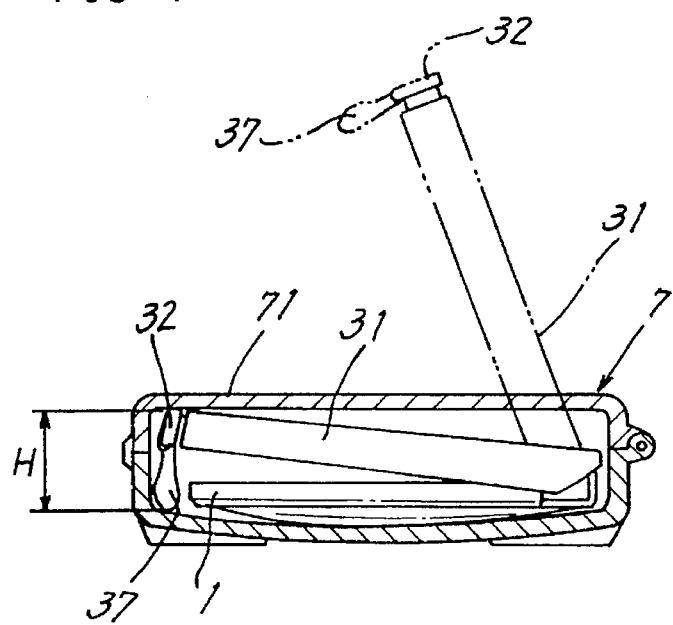
FIG. 7 is an imaginary view of a case as seen from one side thereof with the spectacles of FIG. 6B placed in the case.
Figure 8:
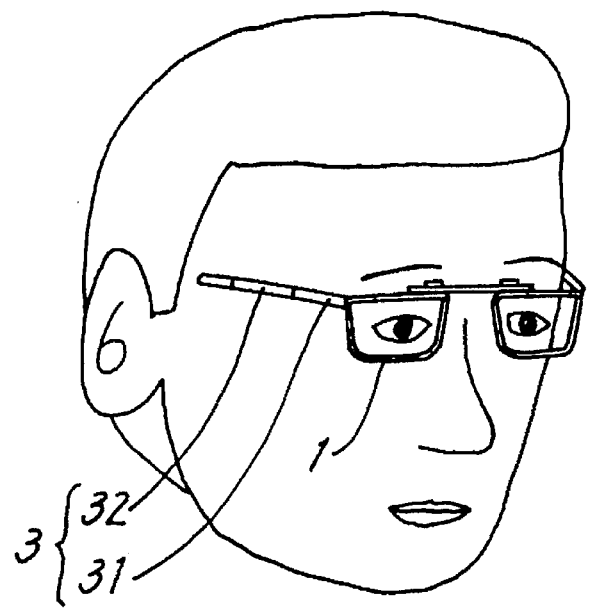
FIG. 8 is a diagram showing the conventional spectacles as worn by the user.
Figure 9:
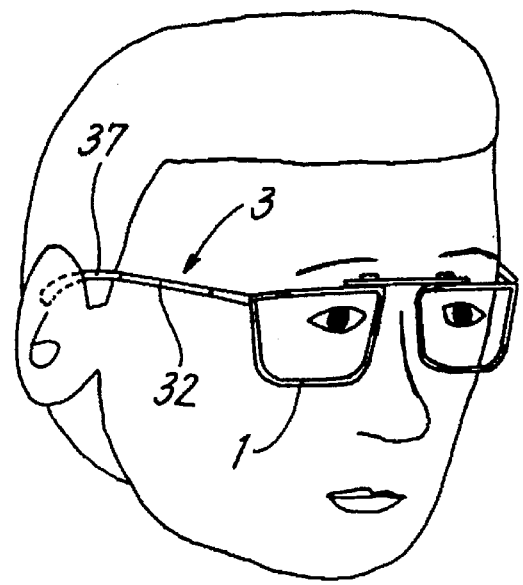
FIG. 9 is a diagram showing spectacles having an earpiece on each of its temples and worn by the user.

To carry the spectacles as folded, the lens frames 1, 1 are moved toward each other until opposite nose pads 12 contact each other. The temples 3, 3 are then folded across each other by flexing the main temple members 32 relative to the respective auxiliary temple members 31. Next, the spectacles are placed into a case 7 with the lenses 11 facing down and with a lid 71 opened. Although the auxiliary temple members 31 project upward from the case 7 in this state as indicated in two-dot-and-dash lines in FIG. 7, the spectacles can be encased as shown in FIGS. 4 and 5 by pushing down the case lid 71 in this state.

When the case lid 71 is closed with the spectacles placed in the case 7, the earpieces 36 are elastically deformed by being pushed by the lid 71, with the outer ends of the bent portions 37 moving along the bottom of the case, so as to be positioned within the same thickness as the lens frames 1, i.e., in the same plane as the lens frames, because the earpieces 36 are made of easily elastically deformable synthetic resin. Accordingly, the case 7 can be reduced in thickness without considering the bent portions 37 of the earpieces 36 and is not bulky for portable use.

The earpieces 36 restore themselves when relieved of the pressure by opening the case lid 71. The spectacles are further convenient to take out from the case because the torsion springs 43 act to raise the temples 3 in a crossing state when the lid 71 is opened. The material for the earpieces 36 is not limited to the superelastic resin described but can be any material insofar as it is elastically deformable by the pressure of the case lid like rubber.

The present invention is not limited to the construction of the foregoing embodiment but can be modified variously by one skilled in the art within the scope set forth in the appended claims.

What is claimed is:

1. In spectacles which are foldable to fit into a thin, compact spectacle case having an inside height ($H_0$) substantially corresponding to a height of a spectacle lens frame, said spectacles including an auxiliary temple member pivotally connected to an outer end of an upper side of a lens frame, and a main temple member pivotally connected to a free end of the auxiliary temple member, the auxiliary temple member and the main temple member being prepared from a light metal and foldable generally in a plane which is the same as the lens frame to accommodate the spectacles in the spectacle case, the improvement comprising:

the main temple member having attached to an outer end thereof an earpiece prepared from an easily elastically deformable synthetic resin, the earpiece having a bent portion with a normal bend height (H) greater than the inside height ($H_0$) of the spectacle case, the earpiece being deformable to a height corresponding to the inside height ($H_0$) of the spectacle case and in a plane with the main temple member and auxiliary temple member corresponding to that of the lens frame.

2. The spectacles of claim 1 wherein the outer end of the main temple member is fitted in an insertion bore formed in the earpiece longitudinally thereof, and a plurality of adjusting holes are formed in the outer end portion of the main temple member, the earpiece being fastened to the main temple member with a screw driven into one of the adjusting holes and a hole formed in the earpiece and registered with said one adjusting hole.

3. The spectacles of claim 1 wherein the auxiliary temple member is provided at a base end thereof with a support pin slightly so inclined as to position its outer end a larger distance away from the upper side of the lens frame, and the support pin is rotatably supported by the outer end of the upper side of the lens frame.

4. The spectacles of claim 1 wherein the main temple member has a base end rotatably supported by the free end of the auxiliary temple member by means of a pivot and provided with a stopper bulging toward the auxiliary temple member beyond the pivot.

5. The spectacles of claim 1, further including:
a spectacle case for receiving said spectacles, said spectacle case having an inside height ($H_o$) substantially corresponding to the height of the lens frame.

6. The spectacles of claim 5, wherein said spectacle case further comprises:
a spectacle case having a thickness less than the bend height (H) of the bent portion of said earpiece; and
said spectacle case inside height ($H_o$) corresponding to a height of the assembly of the lens frame, the auxiliary temple member and the main temple member as folded to a flat platelike form.

7. In a flat spectacle case with foldable spectacles which are accommodated therein, the foldable spectacles comprising an auxiliary temple member pivoted to an outer end of an upper side of a lens frame and a main temple member pivoted to a free end of the auxiliary temple member, the auxiliary temple member and the main temple member being prepared from a light metal and foldable generally in the same plane as the lens frame to accommodate the spectacles in the spectacle case, the improvement comprising:

the main temple member of ther folding spectacles having attached to an outer end thereof an earpiece prepared from an easily elastically deformable synthetic resin, the earpiece having a bent portion with a bent height (H); and the spectacle case having an inside height ($H_o$) smaller than the bent height (H) of the bent portion of the earpiece, the inside height ($H_o$) of the spectacle case substantially corresponding to a height of the assembly of the lens frame, the auxiliary temple member and the main temple member as folded to a flat platelike form.

8. The invention of claim 7, wherein the earpiece is deformable to a height corresponding to the inside height ($H_o$) of the spectacle case and in a plane with the main temple member and auxiliary temple member corresponding to that of the lens frame.

* * * * *